(12) United States Patent
Hosmer

(10) Patent No.: US 8,506,170 B2
(45) Date of Patent: Aug. 13, 2013

(54) BEARING MOUNTED ISOLATOR SEAL

(75) Inventor: Christopher E. Hosmer, Greer, SC (US)

(73) Assignee: Baldor Electric Company, Fort Smith, AK (US)

(*) Notice: Subject to any disclaimer, the term of this patent is extended or adjusted under 35 U.S.C. 154(b) by 32 days.

(21) Appl. No.: 13/271,544

(22) Filed: Oct. 12, 2011

(65) Prior Publication Data

US 2013/0094795 A1    Apr. 18, 2013

(51) Int. Cl.
*F16C 33/76*  (2006.01)
*F16C 33/80*  (2006.01)
*F16J 15/447* (2006.01)

(52) U.S. Cl.
USPC ............ 384/477; 384/480; 384/481; 277/419

(58) Field of Classification Search
USPC ............... 277/411, 412, 418–420; 384/477, 384/478, 480, 481, 482, 484–486, 488, 489
See application file for complete search history.

(56) References Cited

U.S. PATENT DOCUMENTS

| | | | | |
|---|---|---|---|---|
| 1,382,941 | A * | 6/1921 | Steenstrup | 29/890.14 |
| 2,819,100 | A * | 1/1958 | Peterson | 277/421 |
| 4,946,295 | A * | 8/1990 | Hajzler | 384/448 |
| 4,989,883 | A | 2/1991 | Orlowski | |
| 5,028,054 | A * | 7/1991 | Peach | 277/348 |
| 5,221,095 | A * | 6/1993 | Orlowski | 277/303 |
| 5,290,047 | A * | 3/1994 | Duffee et al. | 277/419 |
| 6,845,986 | B2 * | 1/2005 | Hood et al. | 277/409 |
| 7,878,508 | B2 * | 2/2011 | Nobrega | 277/352 |
| 8,240,674 | B2 * | 8/2012 | Hartmann et al. | 277/409 |
| 2004/0070150 | A1 | 4/2004 | Chitren et al. | |
| 2004/0080113 | A1 * | 4/2004 | Linden et al. | 277/412 |
| 2009/0285517 | A1 | 11/2009 | Eckel et al. | |
| 2010/0046874 | A1 | 2/2010 | Hosmer | |
| 2010/0181730 | A1 * | 7/2010 | Roddis | 277/412 |

OTHER PUBLICATIONS

Parker Hanniflin Corporation Feb. 7, 2006 ProTech Bearing Isolators Catalog EPS 5275/USA.

* cited by examiner

*Primary Examiner* — Phillip A Johnson
(74) *Attorney, Agent, or Firm* — Thompson Coburn LLP

(57) ABSTRACT

A bearing is disclosed comprising an inner ring concentrically disposed with an outer ring with rotational elements therebetween adapted for allowing rotational movement of the inner ring relative to the outer ring. A relatively non-resilient isolator seal is mounted to the bearing.

20 Claims, 2 Drawing Sheets

BEARING MOUNTED ISOLATOR SEAL

BACKGROUND

The disclosure is directed to an isolator seal mounted to a bearing.

DETAILED DESCRIPTION OF THE DISCLOSED EMBODIMENTS

Figure 1:
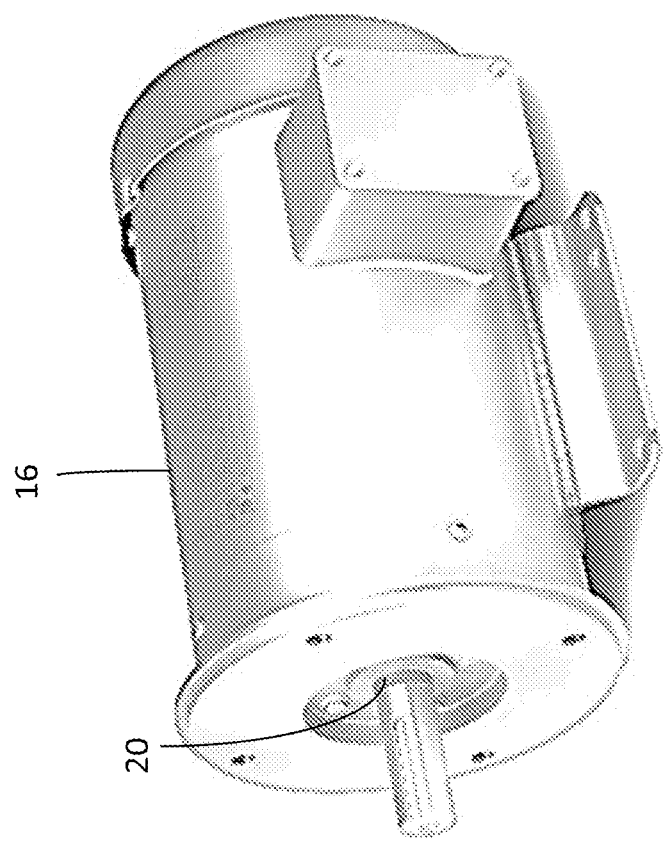
FIG. 1 is a perspective view of an exemplary application for an isolator seal attached to a bearing comprising a wash down motor in which a shaft has a bearing with the isolator seal as described herein.

FIG. 1 shows a typical application in which the isolator seal for a bearing described herein is used. FIG. 1 shows a wash down motor 16 typically used in the food and beverage industry. These types of motors are subjected to high pressure chemical solution sprays during cleaning operations. The wash down motor 16 as shown in FIG. 1 may be provided with a bearing assembly 20, including a bearing 22 and an isolator seal 24 attached to the bearing to provide an improved seal to prevent the ingress of contaminants and high pressure chemical solutions into the bearing. Providing an isolator seal 24 on the motor shaft bearings reduces the requirements for lubrication of the bearing and improves bearing life. Although a wash down motor is shown in FIG. 1, it should be appreciated that the bearing with isolator seal as described herein may be used in other applications, including gear boxes, motors for other applications, pumps, mixers, cooling towers, aerators, blowers, and other custom equipment. The isolator seal as described herein may be IP69k (Ingress Protection rating) compliant.

Figure 2:
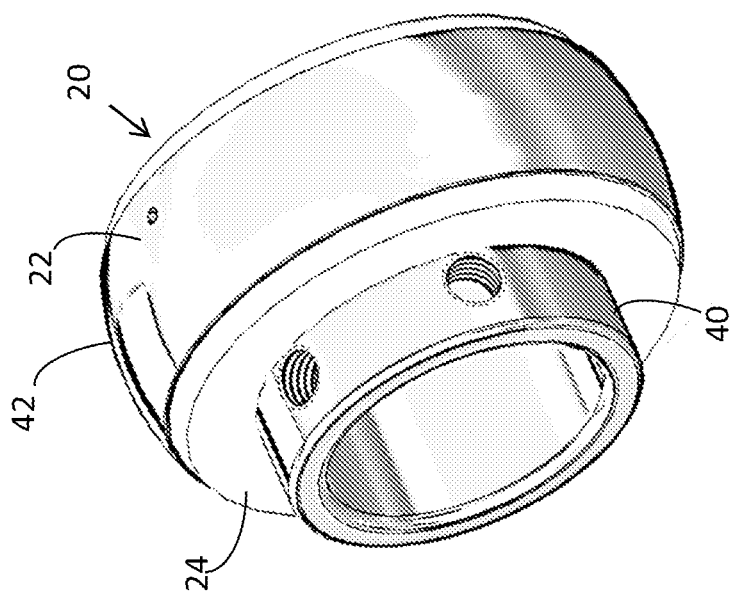
FIG. 2 illustrates a perspective view of a bearing with isolator seal as used in the illustrative application of FIG. 1.

Referring to FIG. 2, the bearing assembly 20 comprises the bearing 22 with the isolator seal 24 for the bearing. The bearing 22 has an inner ring 40 concentrically disposed with an outer ring 42 with the isolator seal 24 disposed between the inner and out rings to prevent the ingress of contaminants into the bearing (i.e., high pressure wash down fluids, food processing debris, etc). The bearing 22 may have a generally spherical shape to allow the bearing to be self-aligning and/or self-centering. That is, the outer ring 42 may have an outer diameter surface with a contour that is shaped to fit in a bearing housing bore. However, the bearing housing bore and bearing may have other configurations such as cylindrical.

Figure 3:
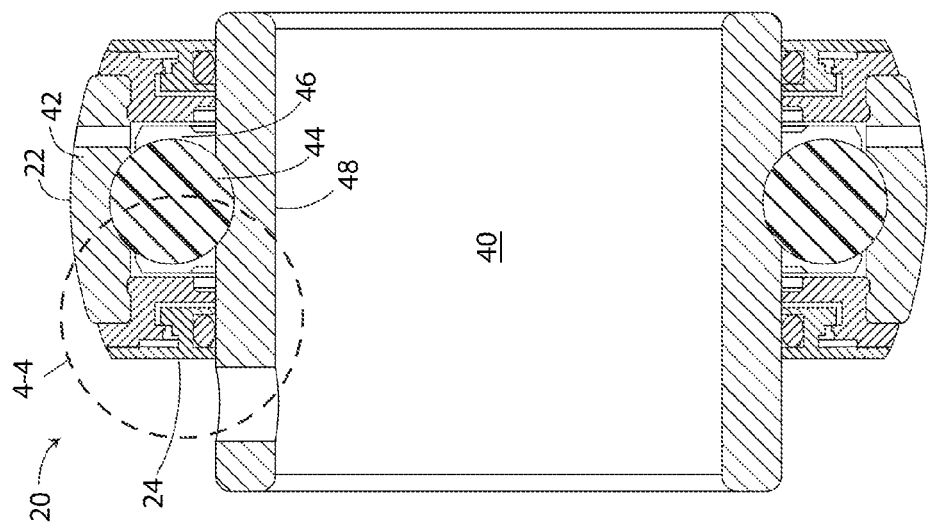
FIG. 3 illustrates a cross-sectional view of the bearing of FIG. 2.
Figure 4:
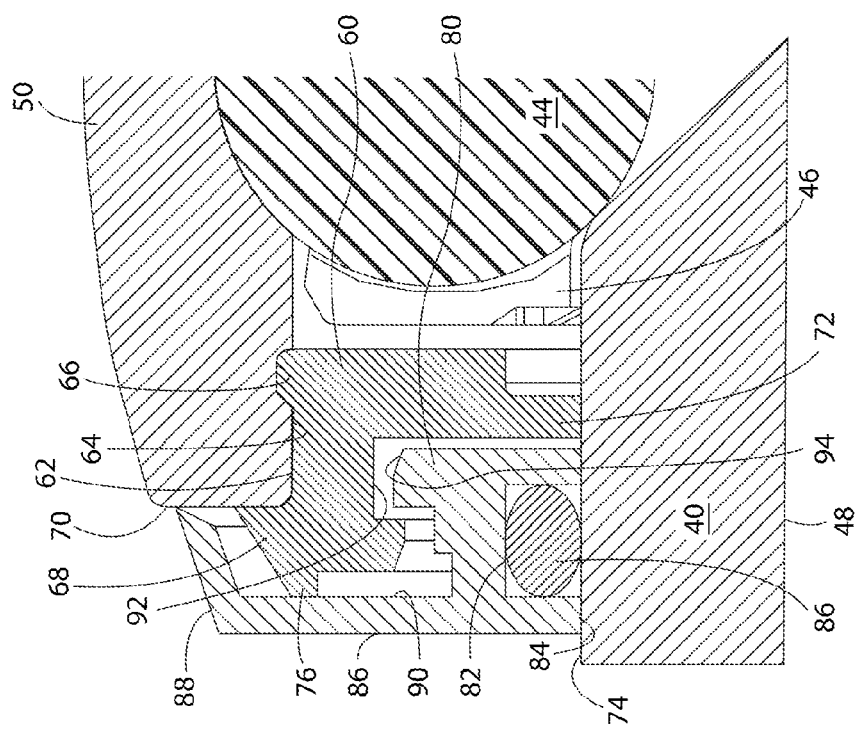
FIG. 4 is an enlarged detail area 4-4 of FIG. 3.

FIGS. 3 and 4 provide further detail of the bearing assembly 20. The bearing inner and outer rings 40,42 are separated with rotational elements 44 therebetween that allow rotational movement of the inner ring relative to the outer ring. As shown in FIGS. 3-4, the rotational elements 44 comprise ball bearings constrained in a spaced circumferential orientation around the bearing with a cage 46. Other rotational elements, such as cylinders, tapered pins or rollers may also be used. The cage 46 may comprise steel, nylon, or polymer materials, depending upon the application. The inner ring has a bore 48 which is sized to accommodate a rotating shaft or other rotating element as may be dictated by a particular application. The outer ring has an outer diameter surface 50 with a contour which is shaped to fit in a bearing housing bore. In the configuration shown in the drawing figures, the inner ring rotates while the outer ring is held stationary. However, it should be appreciated that other configurations of the bearing may be used including fixing the inner ring and rotating the outer ring.

The bearing assembly 20 has the isolator seal 24 on each axial side of the bearing 22 to prevent contaminants from interfering with the operation of the rotational elements. The isolator seal may also be provided on one axial side of the bearing. The isolator seal 24 comprises a stator which is mounted to the bearing outer ring. Preferably, the stator 60 has an outer surface 62 that conforms to the outer ring inner diameter surface 64 to allow the stator to be mounted to the outer ring. Preferably, the outer ring inner diameter surface 64 has a groove 66 and the stator outer surface 62 has cooperating features that allow the stator to be fitted in the inner diameter of the outer ring. Preferably, the stator 60 has additional features to fixably mount the stator to the outer ring. For instance, the stator outer surface 62 may be dimensioned to snap fit or press fit into the outer ring inner diameter surface 64. The stator have an outer surface portion 68 extending radially outward along an outer ring side face 70 of the outer ring to provide additional stability for the stator. Preferably, the stator outer surface 64 has dimensions relative to the outer ring inner diameter surface 62 that enable the stator to be fixably mounted in a bore defined by the outer ring inner diameter surface. As the outer ring 42 is fixed to a bearing housing, each of the outer ring and stator 60 is relatively stationary during operation. The stator 60 has an inner diameter tapered portion 72 which engages the inner ring 40. Preferably, the stator inner diameter tapered portion 72 engages an outer diameter surface 74 of the inner ring. Preferably, the stator inner diameter tapered portion 72 is dimensioned to engage the inner ring during normal operation of the bearing and isolator seal. Preferably, the stator inner diameter tapered portion 72 wears into rotational sealing contact with the inner ring during normal operation of the bearing and isolator seal. Although the drawings show the stator as having a snap or press fit with the outer ring and the stator engaging the outer ring, a resilient member, such as an O-ring, may be disposed between the stator and outer ring to fixably mount the stator to the outer ring. The stator 60 also has a side face tapered portion 76 that provides spacing for the isolator seal as will be described in greater detail below.

The isolator seal also comprises a rotor 80. The rotor is preferably fixed with the inner ring and rotates with the inner ring. The rotor preferably has a groove 82 on its inner diameter surface 84 adapted to hold a resilient member 86, such as an O-ring. The rotor resilient member 86 preferably cooperates with the rotor groove 82 to enable the rotor to be mounted to the bearing inner ring. Preferably, the rotor 80 is fixably mounted to the bearing inner ring 40 for rotational movement with the bearing inner ring. The rotor 80 has an extension member 86 extending radially outward from the groove. The extension member 86 preferably engages the stator side face tapered portion 76 to position the rotor axially relative to the stator for optimal sealing. The extension member has a wiper member 88 extending therefrom. Preferably, the wiper member 88 engages the outer ring side face 70. Preferably, the wiper member 88 is dimensioned to wear into sealing contact with the outer ring side face 70 during normal operation of the bearing. Together, the rotor wiper member 88 and the stator side face tapered portion 76 are dimensioned for optimal sealing. For instance, the stator side face tapered portion 76 engages an inner side face 90 of the extension member at a distance where the rotor wiper member 88 engages the outer ring side face 70.

The rotor and stator have at least one cooperating groove 92 and ridge 94 on adjacent surfaces that allow rotational movement between the rotor and stator during normal operation of the bearing. The ridge 94 and groove 92 may interlocking to enable the stator and rotor to be assembled together prior to installation with the bearing. Thus, the rotor and stator forming the isolator seal may be assembled with the bearing as necessary depending upon the application. As shown in the drawings, the rotor and stator groove 92 and ridge 94 are dimensioned such that the rotor and stator have relative rotational movement when the rotor and stator are assembled on the inner and outer ring, respectively. A plurality of grooves and ridges may be provided on adjacent surfaces. Preferably, the groove 92 and ridge 94 have sufficient spacing there between to allow any fluid or debris disposed between the rotor and stator to drain from the isolator seal when the bearing is in a static condition.

Because the isolator seal is mounted directly to the bearing, as opposed to the housing, the bearing and isolator seal may be used in a self-aligning application. Preferably, the rotor and stator are made from a food-grade, mineral-filled polytetrafluoroethylene. Preferably, the rotor and stator are made from the same material and monolithically formed. Preferably, the inner and outer rings are made from a stainless material.

While the specific embodiments have been described in detail in the foregoing detail description and illustrated in the accompanying drawings, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the pending claims and any and all equivalents thereof.

What is claimed is:

1. A bearing assembly comprising:
   an inner ring disposed within an outer ring with rotational elements therebetween adapted for allowing rotational movement of the inner ring relative to the outer ring;
   the outer ring having an outer diameter surface adapted to be received in a housing for the bearing and an inner diameter surface with a side face extending between the outer diameter and inner diameter surfaces; and
   an isolator seal disposed in the bearing comprising a stator and a rotor, the stator being releasably mounted to the outer ring and rotationally engaging the bearing inner ring, the rotor being releasably mounted to the bearing inner ring, the rotor having an extension member extending radially outward and rotationally engaging the stator, the extension member having a wiper member extending axially and rotationally engaging the outer ring side face, the rotor and stator being monolithically formed from non-resilient materials, the rotor and stator having adjacent surfaces with at least one cooperating annular groove and annular ridge that enable the stator and rotor to rotate when the isolator seal is installed in the bearing and the bearing is in normal operation.

2. The bearing assembly of claim 1, wherein the stator has an outer surface that conforms to the outer ring inner diameter surface.

3. The bearing assembly of claim 1, wherein the rotor has an inner surface with a seal ring.

4. The bearing assembly of claim 3 wherein the seal ring fixes the rotor on the inner ring.

5. The bearing assembly of claim 1 wherein the stator has a grooved outer diameter surface that cooperates with the outer ring inner diameter surface.

6. The bearing assembly of claim 1 wherein the stator is fixed to the outer ring.

7. The bearing assembly of claim 1 wherein the isolator seal comprises polytetrafluoroethylene.

8. The bearing assembly of claim 1 wherein the stator is dimensioned to wear into sealing contact with the inner ring.

9. The bearing assembly of claim 1 wherein the rotor wiper member is dimensioned to wear into sealing contact with the outer ring side face.

10. The bearing assembly of claim 1 wherein the rotor extension member wears into sealing contact with the stator.

11. A bearing assembly comprising:
    an inner ring disposed within an outer ring with rotational elements therebetween adapted for allowing rotational movement of the inner ring relative to the outer ring;
    the outer ring having an outer diameter surface adapted to be received in a housing for the bearing and an inner diameter surface with a side face extending between the outer diameter and inner diameter surfaces; and
    an isolator seal comprising a stator and a rotor, the stator forming a seal with the outer ring, the rotor forming a seal with the bearing inner ring, the stator having a sealing member extending axially and rotationally engaging the rotor, the rotor extending radially and axially and rotationally engaging the outer ring, the rotor and stator being monolithically formed from non-resilient materials, the rotor and stator having adjacent surfaces with interlocking features that enable the stator and rotor to be releasably secured together as an assembly prior to installation in the bearing and enable the stator and rotor to rotate when installed in the bearing during normal operation of the bearing.

12. The bearing assembly of claim 11, wherein the stator has an outer surface that conforms to the outer ring inner diameter surface.

13. The bearing assembly of claim 11, wherein the rotor has an inner surface with a seal ring.

14. The bearing of claim 13 wherein the seal ring fixes the rotor on the inner ring.

15. The bearing assembly of claim 11 wherein the stator has a grooved outer diameter surface that cooperates with the outer ring inner diameter surface.

16. The bearing assembly of claim 11 wherein the stator is fixed to the outer ring.

17. The bearing assembly of claim 11 wherein the isolator seal comprises polytetrafluoroethylene.

18. The bearing assembly of claim 11 wherein the stator is dimensioned to wear into sealing contact with the inner ring.

19. The bearing assembly of claim 11 wherein the rotor wiper member is dimensioned to wear into sealing contact with the outer ring side face.

20. The bearing assembly of claim 11 wherein the rotor extension member wears into sealing contact with the stator.

* * * * *